(12) United States Patent
Chen

(10) Patent No.: US 11,120,753 B2
(45) Date of Patent: Sep. 14, 2021

(54) LIQUID CRYSTAL DISPLAY AND METHOD FOR DRIVING SAME

(71) Applicants: HKC CORPORATION LIMITED, Shenzhen (CN); CHONGQING HKC OPTOELECTRONICS TECHNOLOGY CO., LTD., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 16/309,940

(22) PCT Filed: Dec. 26, 2017

(86) PCT No.: PCT/CN2017/118577
§ 371 (c)(1),
(2) Date: Dec. 14, 2018

(87) PCT Pub. No.: WO2018/121519
PCT Pub. Date: Jul. 5, 2018

(65) Prior Publication Data
US 2020/0312254 A1    Oct. 1, 2020

(30) Foreign Application Priority Data

Dec. 27, 2016    (CN) .......................... 201611227794.0

(51) Int. Cl.
*G09G 3/36*    (2006.01)
*G09G 3/34*    (2006.01)
(Continued)

(52) U.S. Cl.
CPC ......... *G09G 3/3607* (2013.01); *G02F 1/1368* (2013.01); *G02F 1/13306* (2013.01);
(Continued)

(58) Field of Classification Search
CPC ......... G09G 2320/0646; G09G 3/3644; G09G 3/3666; G09G 2320/0261;
(Continued)

(56) References Cited

U.S. PATENT DOCUMENTS

| 2005/0184944 A1* | 8/2005 | Miyata | G09G 3/3611 345/89 |
| 2009/0079688 A1* | 3/2009 | Chen | G09G 3/3406 345/102 |

(Continued)

FOREIGN PATENT DOCUMENTS

| CN | 101393727 A | 3/2009 |
| CN | 103456257 A | 12/2013 |

(Continued)

OTHER PUBLICATIONS

Ping Wah Wong, Chapter 8.1: "Image Quantization, Halftoning, and Printing", Handbook of Image and Video Processing (Second Edition) 2005, pp. 925-937. (Year: 2005).*

(Continued)

*Primary Examiner* — Julie Anne Watko
(74) *Attorney, Agent, or Firm* — Kilpatrick Townsend & Stockton

(57) ABSTRACT

A liquid crystal display and a method for driving same, capable of eliminating large viewing angle color shift of a liquid crystal display having VA liquid crystals. The liquid crystal display includes a liquid crystal panel and a driving module. The liquid crystal panel includes a plurality of liquid crystal pixels ($P_{ab}$, wherein $1 \leq a \leq A$, $1 \leq b \leq B$, and both a and b are integers) arranged in an array. The liquid crystal (Continued)

display is configured to display a same picture in two adjacent frames. The driving module is used for respectively providing different pixel voltages of the same polarity to each liquid crystal pixel ($P_{ab}$) in the two adjacent frames to deflect liquid crystal molecules of the liquid crystal pixel ($P_{ab}$).

13 Claims, 5 Drawing Sheets

(51) Int. Cl.
    *G02F 1/13357* (2006.01)
    *G02F 1/1337* (2006.01)
    *G02F 1/1345* (2006.01)
    *G02F 1/1362* (2006.01)
    *G02F 1/1335* (2006.01)
    *G02F 1/133* (2006.01)
    *G02F 1/1333* (2006.01)
    *G02F 1/1368* (2006.01)

(52) U.S. Cl.
    CPC .... *G02F 1/13452* (2013.01); *G02F 1/133308* (2013.01); *G02F 1/133514* (2013.01); *G02F 1/133611* (2013.01); *G02F 1/133753* (2013.01); *G02F 1/136286* (2013.01); *G09G 3/3406* (2013.01); *G09G 3/3426* (2013.01); *G09G 3/367* (2013.01); *G09G 3/3611* (2013.01); *G09G 3/3614* (2013.01); *G09G 3/3648* (2013.01); *G09G 3/3666* (2013.01); *G09G 3/3677* (2013.01); *G02F 1/1362* (2013.01); *G02F 1/133601* (2021.01); *G02F 2201/52* (2013.01); *G09G 3/3644* (2013.01); *G09G 2310/0254* (2013.01); *G09G 2320/0233* (2013.01); *G09G 2320/0242* (2013.01); *G09G 2320/0247* (2013.01); *G09G 2320/0261* (2013.01); *G09G 2320/0285* (2013.01); *G09G 2320/062* (2013.01); *G09G 2320/068* (2013.01); *G09G 2320/0626* (2013.01); *G09G 2320/0646* (2013.01); *G09G 2320/0653* (2013.01); *G09G 2320/0666* (2013.01); *G09G 2320/0686* (2013.01); *G09G 2340/16* (2013.01)

(58) Field of Classification Search
    CPC ..... G09G 2320/028; G09G 2320/0285; G09G 2320/0242; G09G 2320/0653; G09G 2320/068; G09G 2320/0686; G09G 3/3426; G09G 3/342; G09G 2320/0247; G09G 3/3406; G09G 3/34; G09G 3/3275; G09G 3/3291; G09G 3/2092; G09G 3/20; G09G 3/2044; G09G 3/2048; G09G 3/2051; G09G 3/2055; G09G 3/00; G09G 3/3614; G09G 3/3622; G09G 3/3648; G09G 3/3685; G09G 3/3696; G09G 3/3611; G09G 3/36; G09G 2320/0233; G09G 2320/02; G09G 2320/00; G09G 2320/04; G09G 2320/06; G09G 2320/062; G09G 2320/0626; G09G 2340/16; G09G 2340/00; G09G 3/3607; G09G 3/367; G09G 3/3677; G09G 2310/0254; G09G 2320/0666; G02F 1/13306; G02F 1/133308; G02F 1/133514; G02F 1/133611; G02F 1/133753; G02F 1/13452; G02F 1/136286; G02F 1/1368; G02F 1/133601; G02F 1/1362; G02F 2201/52
    See application file for complete search history.

(56) References Cited

U.S. PATENT DOCUMENTS

| | | | | |
|---|---|---|---|---|
| 2010/0207969 A1* | 8/2010 | Ueki | ............. | G09G 3/3607 345/694 |
| 2012/0105507 A1* | 5/2012 | An | ............. | G09G 3/3426 345/690 |
| 2012/0105514 A1* | 5/2012 | Yamato | ............. | G09G 3/3648 345/691 |
| 2013/0321483 A1* | 12/2013 | You | ............. | G09G 3/3651 345/690 |
| 2013/0342430 A1* | 12/2013 | Huang | ............. | G09G 3/3406 345/88 |
| 2014/0247289 A1* | 9/2014 | Park | ............. | G09G 3/2055 345/690 |
| 2016/0275843 A1* | 9/2016 | Shin | ............. | G09G 3/3614 |
| 2017/0140715 A1* | 5/2017 | Lien | ............. | G09G 3/2003 |
| 2017/0162137 A1* | 6/2017 | Chen | ............. | G09G 3/3607 |
| 2019/0310521 A1* | 10/2019 | Chen | ............. | G09G 3/3666 |
| 2020/0043424 A1* | 2/2020 | Harrington | ............. | G02F 1/163 |
| 2020/0064688 A1* | 2/2020 | Lin | ............. | H05B 45/10 |

FOREIGN PATENT DOCUMENTS

| | | |
|---|---|---|
| CN | 104795037 A | 7/2015 |
| CN | 106531106 A | 3/2017 |

OTHER PUBLICATIONS

International Search Report dated Mar. 22, 2018 in the corresponding PCT application (application No. PCT/CN2017/118577).

\* cited by examiner

```
┌─────────────────────────────────────────────────────────────┐
│ In a previous frame of the two adjacent frames, a driving   │
│ module 20 provides a pixel voltage for each of the liquid   │
│ crystal pixels of the liquid crystal panel 10, so as to     │──S410
│ deflect liquid crystal molecules of each of the liquid      │
│ crystal pixels                                              │
└─────────────────────────────────────────────────────────────┘
                              │
                              ▼
┌─────────────────────────────────────────────────────────────┐
│ In the previous frame of the two adjacent frames, after the │
│ liquid crystal molecules of the liquid crystal pixels in    │
│ the rectangular panel partitions $10_{11}, 10_{12}, \ldots, │
│ 10_{MN}$ of the liquid crystal panel 10 are deflected,      │
│ the driving module 20 drives all of the rectangular         │──S420
│ backlight partitions $30_{11}, 30_{12}, \ldots, 30_{MN}$    │
│ to emit light at the same time, where the sum of the        │
│ pixel voltages of $10_{ij}$ and the luminance of $30_{ij}$  │
│ satisfy $L_{ij\_1} * V_{ij\_1} = L_{ij\_2} * V_{ij\_2}$,    │
│ wherein $L_{ij\_1}$ denotes the luminance of the            │
│ rectangular panel partition $10_{ij}$ in the previous       │
│ frame of the two adjacent frames, $V_{ij\_1}$ denotes the   │
│ sum of the pixel voltages of the liquid crystal pixels in   │
│ the rectangular panel partition $10_{ij}$ in the previous   │
│ frame of the two adjacent frames, $L_{ij\_2}$ denotes the   │
│ luminance of the rectangular backlight partition $30_{ij}$  │
│ in the subsequent frame of the two adjacent frames, and     │
│ $V_{ij\_2}$ denotes the sum of the pixel voltages of the    │
│ liquid crystal pixels in the rectangular panel partition    │
│ $30_{ij}$ in the subsequent frame of the two adjacent       │
│ frames.                                                     │
└─────────────────────────────────────────────────────────────┘
                              │
                              ▼
┌─────────────────────────────────────────────────────────────┐
│ In a subsequent frame of the two adjacent frames, the       │
│ driving module 20 provides a pixel voltage for each of      │
│ the liquid crystal pixels of the liquid crystal panel 10,   │──S430
│ so as to deflect liquid crystal molecules of each of the    │
│ liquid crystal pixels                                       │
└─────────────────────────────────────────────────────────────┘
                              │
                              ▼
┌─────────────────────────────────────────────────────────────┐
│ In the subsequent frame of the two adjacent frames, after   │
│ the liquid crystal molecules of the liquid crystal pixels   │
│ in the rectangular panel partitions $10_{11}, 10_{12},      │
│ \ldots, 10_{MN}$ of the liquid crystal panel 10 are         │──S440
│ deflected, the driving module 20 drives all of the          │
│ rectangular backlight partitions $30_{11}, 30_{12}, \ldots, │
│ 30_{MN}$ to emit light at the same time                     │
└─────────────────────────────────────────────────────────────┘
```

FIG. 4

S510 — In a previous frame of the two adjacent frames, a driving module 20 provides a pixel voltage for each of the liquid crystal pixels of the liquid crystal panel 10, so as to deflect liquid crystal molecules of each of the liquid crystal pixels S520 — In the previous frame of the two adjacent frames, after the liquid crystal molecules of the liquid crystal pixels in the rectangular panel partitions $10_{ij}$ of the liquid crystal panel 10 are deflected, the driving module 20 drives the rectangular backlight partition $30_{ij}$ to emit light, until all of the rectangular backlight partitions $30_{11}, 30_{12}, \ldots \ldots, 30_{MN}$ are driven to emit light, where the sum of the pixel voltages of n $10_{ij}$ and the luminance of $30_{ij}$ satisfy $L_{ij\_1}*V_{ij\_1} + L_{ij\_2}*V_{ij\_2} = 2*L_{ij}*V_{ij}$, wherein $L_{ij}$ denotes the luminance of the corresponding rectangular backlight partition when the liquid crystal panel without being applied by any compensation for a viewing angle against low color shift is configured to display the image in only one frame, $V_{ij}$ denotes the sum of the pixel voltages of the liquid crystal pixels in the corresponding rectangular panel partition when the liquid crystal panel without being applied by any compensation for a viewing angle against low color shift is configured to display the image in only one frame.

S530 — In a subsequent frame of the two adjacent frames, the driving module 20 provides a pixel voltage for each of the liquid crystal pixels of the liquid crystal panel 10, so as to deflect liquid crystal molecules of each of the liquid crystal pixels S540 — In the subsequent frame of the two adjacent frames, after the liquid crystal molecules of the liquid crystal pixels in the rectangular panel partitions $10_{ij}$ of the liquid crystal panel 10 are deflected, the driving module 20 drives the rectangular backlight partition $30_{ij}$ to emit light, until all of the rectangular backlight partitions $30_{11}, 30_{12}, \ldots \ldots, 30_{MN}$ are driven to emit light

FIG. 5

LIQUID CRYSTAL DISPLAY AND METHOD FOR DRIVING SAME

FILED

The present disclosure relates to the field of display technologies, in particular, to a liquid crystal display and method for driving same.

BACKGROUND

With the evolution of optoelectronics and semiconductor technologies, Flat Panel Displays have thereby a booming development as well. Among various Flat Panel Displays, Liquid Crystal Displays (LCD) have been applied in various aspects of production and daily life due to a number of advantageous characteristics such as high space utilization efficiency, low power consumption, no radiation, low electromagnetic interference and the like. A liquid crystal display typically includes a liquid crystal panel, a backlight module and a driving module driving the liquid crystal panel and the backlight module, wherein the liquid crystal panel includes a color filter substrate (i.e. CF substrate) and an array substrate which are configured by cell-aligning, and liquid crystals interposed therebetween. Among the existing large dimensioned liquid crystal panels, negative-type VA (Vertically Aligned) liquid crystals are mostly adopted. However, negative-type VA liquid crystals have many deficiencies. Particularly, color shift phenomenon may occur as a liquid crystal panel using negative-type VA type liquid crystals is viewed at a large viewing angle, when desired to present the liquid crystal panel at a large viewing angle.

To overcome the deficiencies as described above, it tends to further divide respective sub pixels into Main/Sub secondary pixels, and provide different pixel voltages to the Main/Sub secondary pixels. However, such pixel design often requires for adding metal wires and thin-film transistors (TFT) to drive the Main/Sub secondary pixels, which causes the sacrifice of the aperture ratio, resulting in the reduction of transmittance. In order to maintain the original transmittance, it is necessary to increase the luminance of the light emitted by the backlight module, thereby directly increasing the cost of the backlight module.

SUMMARY

To solve the problem described above, the present disclosure provides a liquid crystal display and a driving method thereof that solve low color shift without affecting aperture ratio.

The present disclosure provides a liquid crystal display, which includes: a liquid crystal panel, including a plurality of liquid crystal pixels arranged in array and configured to display the same image in two adjacent frames; a driving module, configured to respectively provide different pixel voltages of the same polarity for each of the liquid crystal pixels in two adjacent frames, so as to deflect liquid crystal molecules of each of the liquid crystal pixels, wherein the pixel voltage of each liquid crystal pixel in each of the two adjacent frames changes with an average pixel voltage of each of the liquid crystal pixels in a pixel interval as a parameter, from which the liquid crystal pixel is spaced respectively by a plurality of pixel distances along a first direction, a second direction, a third direction and a fourth direction.

Further, the liquid crystal display also includes a backlight module, wherein the liquid crystal panel is divided into M×N rectangular panel partitions, the backlight module is divided into M×N rectangular backlight partitions, $1 \le i \le M$, $1 \le j \le N$, and the rectangular panel partition of the i-th row and the j-th column corresponds to the rectangular backlight partition of the i-th row and the j-th column. In each of the two adjacent frames, after the liquid crystal molecules of each liquid crystal pixel in each of the rectangular panel partitions are deflected, the driving module is further configured to drive all of the rectangular backlight partitions to emit light at the same time, or in each of the two adjacent frames, after the liquid crystal molecules of each liquid crystal pixel in the rectangular panel partition of the i-th row and the j-th column are deflected, the driving module is further configured to drive the rectangular backlight partition of the i-th row and the j-th column to emit light, until all of the rectangular backlight partitions are driven to emit light.

Further, the sum of the pixel voltages of the liquid crystal pixels in the rectangular panel partition of the i-th row and j-th column and a luminance of the rectangular backlight partition of the i-th row and j-th column satisfy the following formula 1, $$L_{ij\_1} * V_{ij\_1} = L_{ij\_2} * V_{ij\_2} \qquad \text{[Formula 1]}$$

wherein $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

Further, the sum of the pixel voltages of the liquid crystal pixels in the rectangular panel partition of the i-th row and j-th column and the luminance of the rectangular backlight partition of the i-th row and j-th column satisfy the following formula 2, $$L_{ij\_1} * V_{ij\_1} + L_{ij\_2} * V_{ij\_2} = 2 * L_{ij} * V_{ij} \qquad \text{[Formula 2]}$$

wherein $L_{ij}$ denotes the luminance of the rectangular backlight partition of the i-th row and j-th column when the liquid crystal display is configured to display the image only in one frame, $V_{ij}$ denotes the sum of the pixel voltages of the liquid crystal pixels in the rectangular panel partition when the liquid crystal display is configured to display the image only in one frame, $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

The present disclosure further provides a driving method for a liquid crystal display that includes a liquid crystal panel including a plurality of liquid crystal pixels arranged in array, and a driving module, and the liquid crystal panel is configured to display the same image in two adjacent frames, wherein the driving method for the liquid crystal display includes:

providing, by a driving module, a pixel voltage to each of the liquid crystal pixels in a previous frame of the two adjacent frames, so as to deflect liquid crystal molecules of each of the liquid crystal pixels, providing, by the driving module, a pixel voltage to each of the liquid crystal pixels in a subsequent frame of the two adjacent frames, so as to deflect liquid crystal molecules of each of the liquid crystal pixels, wherein the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction, and the pixel voltages of the same liquid crystal pixel in the previous frame and in the subsequent frame have the same polarity but are different in values.

Further, the liquid crystal display also includes a backlight module, wherein the liquid crystal panel is divided into M×N rectangular panel partitions, the backlight module is divided into M×N rectangular backlight partitions, $1 \leq i \leq M$, $1 \leq j \leq N$, and the rectangular panel partition of the i-th row and the j-th column corresponds to the rectangular backlight partition of the i-th row and the j-th column.

The driving method for the liquid crystal display further includes:

in the previous frame of the two adjacent frames, after the liquid crystal molecules of each liquid crystal pixel in each of the rectangular panel partitions are deflected, driving, by the driving module, all of the rectangular backlight partitions to emit light at the same time, and in the subsequent frame of the two adjacent frames, after the liquid crystal molecules of each liquid crystal pixel in each of the rectangular panel partitions are deflected, driving, by the driving module, all of the rectangular backlight partitions to emit light at the same time.

Alternatively, the driving method for the liquid crystal display further includes:

in the previous frame of the two adjacent frames, after the liquid crystal molecules of each liquid crystal pixel in the rectangular panel partition of the i-th row and j-th column are deflected, driving, by the driving module, the rectangular backlight partition of the i-th row and j-th column to emit light, until all of the rectangular backlight partitions are driven to emit light, and in the subsequent frame of the two adjacent frames, after the liquid crystal molecules of each liquid crystal pixel in the rectangular panel partition of the i-th row and j-th column are deflected, driving, by the driving module, the rectangular backlight partition of the i-th row and j-th column to emit light, until all of the rectangular backlight partitions are driven to emit light.

Further, the sum of the pixel voltages of the liquid crystal pixels in the rectangular panel partition of the i-th row and j-th column and the luminance of the rectangular backlight partition of the i-th row and j-th column satisfy the formula 1 and/or the formula 2 as following according to the driving method for the liquid crystal display described above, $$L_{ij\_1} * V_{ij\_1} = L_{ij\_2} * V_{ij\_2} \quad \text{[Formula 1]}$$

$$L_{ij\_1} * V_{ij\_1} + L_{ij\_2} * V_{ij\_2} = 2 * L_{ij} * V_{ij} \quad \text{[Formula 2]}$$

wherein, $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames, $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

The present disclosure provides a liquid crystal display, including: a liquid crystal panel including a plurality of liquid crystal pixels and configured to display the same image in two adjacent frames. The liquid crystal display further includes a backlight module wherein the liquid crystal panel is divided into M×N rectangular panel partitions, the backlight module is divided into M×N rectangular backlight partitions, $1 \leq i \leq M$, $1 \leq j \leq N$, and the rectangular panel partition of the i-th row and the j-th column corresponds to the rectangular backlight partition of the i-th row and the j-th column; and a driving module, configured to respectively provide different pixel voltages of the same polarity for each of the liquid crystal pixels in two adjacent frames, so as to deflect liquid crystal molecules of each of the liquid crystal pixels. After the liquid crystal molecules of each liquid crystal pixel in each of the rectangular panel partitions are deflected, the driving module is further configured to drive all of the rectangular backlight partitions to emit light at the same time, wherein in each of the two adjacent frames the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction.

Further, the sum of the pixel voltages of the liquid crystal pixels in the rectangular panel partition of the i-th row and j-th column and the luminance of the rectangular backlight partition of the i-th row and j-th column satisfy the following formula 1, $$L_{ij\_1} * V_{ij\_1} = L_{ij\_2} * V_{ij\_2} \quad \text{[Formula 1]}$$

wherein $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

Further, the sum of the pixel voltages of the liquid crystal pixels in the rectangular panel partition of the i-th row and j-th column and the luminance of the rectangular backlight partition of the i-th row and j-th column satisfy the following formula 2, $$L_{ij\_1} * V_{ij\_1} + L_{ij\_2} * V_{ij\_2} = 2 * L_{ij} * V_{ij} \quad \text{[Formula 2]}$$

wherein $L_{ij}$ denotes the luminance of the rectangular backlight partition of the i-th row and j-th column when the liquid crystal display is configured to display the image only in one frame, $V_{ij}$ denotes the sum of the pixel voltages of the liquid crystal pixels in the rectangular panel partition when the liquid crystal display is configured to display the image only in one frame, $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

Further, the sum of the pixel voltages of the liquid crystal pixels in the rectangular panel partition of the i-th row and j-th column and the luminance of the rectangular backlight partition of the i-th row and j-th column satisfy the following formula 2, $$L_{ij\_1}*V_{ij\_1}+L_{ij\_2}*V_{ij\_2}=2*L_{ij}*V_{ij} \quad \text{[Formula 2]}$$

wherein $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

Further, the sum of the pixel voltages of the liquid crystal pixels in the rectangular panel partition of the i-th row and j-th column and the luminance of the rectangular backlight partition of the i-th row and j-th column satisfy the formula 1 and or the formula 2 as following, $$L_{ij\_1}*V_{ij\_1}=L_{ij\_2}*V_{ij\_2} \quad \text{[Formula 1]}$$

$$L_{ij\_1}*V_{ij\_1}+L_{ij\_2}*V_{ij\_2}=2*L_{ij}*V_{ij} \quad \text{[Formula 2]}$$

wherein $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames, $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

By means of providing each of the liquid crystal pixels in two adjacent frames with different pixel voltages of the same polarity respectively in the two adjacent frames, and changing of the pixel voltage of each liquid crystal pixel in each of the two adjacent frames with an average pixel voltage of each of the liquid crystal pixels in a pixel interval as a parameter, from which the liquid crystal pixel is spaced respectively by a plurality of pixel distances along a first direction, a second direction, a third direction and a fourth direction, a compensation effect for a viewing angle against low color shift is thereby achieved while the liquid crystal panel displays the same image in the two adjacent frames, i.e. color shift phenomenon may not occur as viewing the liquid crystal panel in a direction of an large viewing angle. Moreover, it may be not necessary to add any metal wires and thin-film transistors to drive Main/Sub secondary pixels, since a liquid crystal pixel is not divided into Main/Sub secondary pixels any more, thus not reducing the aperture ratio. Further, in the previous and subsequent frame of the two adjacent frames, the products of the luminance of each of the rectangular backlight partitions and the sum of the pixel voltages of the liquid crystal pixels in the corresponding rectangular panel partition are equal, so as to equalize the displaying luminance of each of the rectangular panel partitions in the two adjacent frames, and thus flicker phenomenon can be eliminated. Furthermore, the sum of the luminance of the same image displayed in two adjacent frames in each of rectangular panel partitions of the liquid crystal panel is to be twice of the luminance of the image displayed in one frame of the liquid crystal panel without being applied by any compensation effects for a viewing angle against low color shift, so as to equalize the luminance of the image displayed in the liquid crystal panel with the luminance of the image displayed in the liquid crystal panel without being applied by any compensation effects for a viewing angle against low color shift.

BRIEF DESCRIPTION OF THE DRAWINGS

The above and other aspects, features and advantages of embodiments of the present disclosure will become more apparent from the following description taken in conjunction with the accompanying drawings, in which:

FIG. 4 is a flow chart of a driving method for the liquid crystal display shown in FIG. 2.

FIG. 5 is a flow chart of another driving method for the liquid crystal display shown in FIG. 2.

DETAILED DESCRIPTION OF THE INVENTION

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
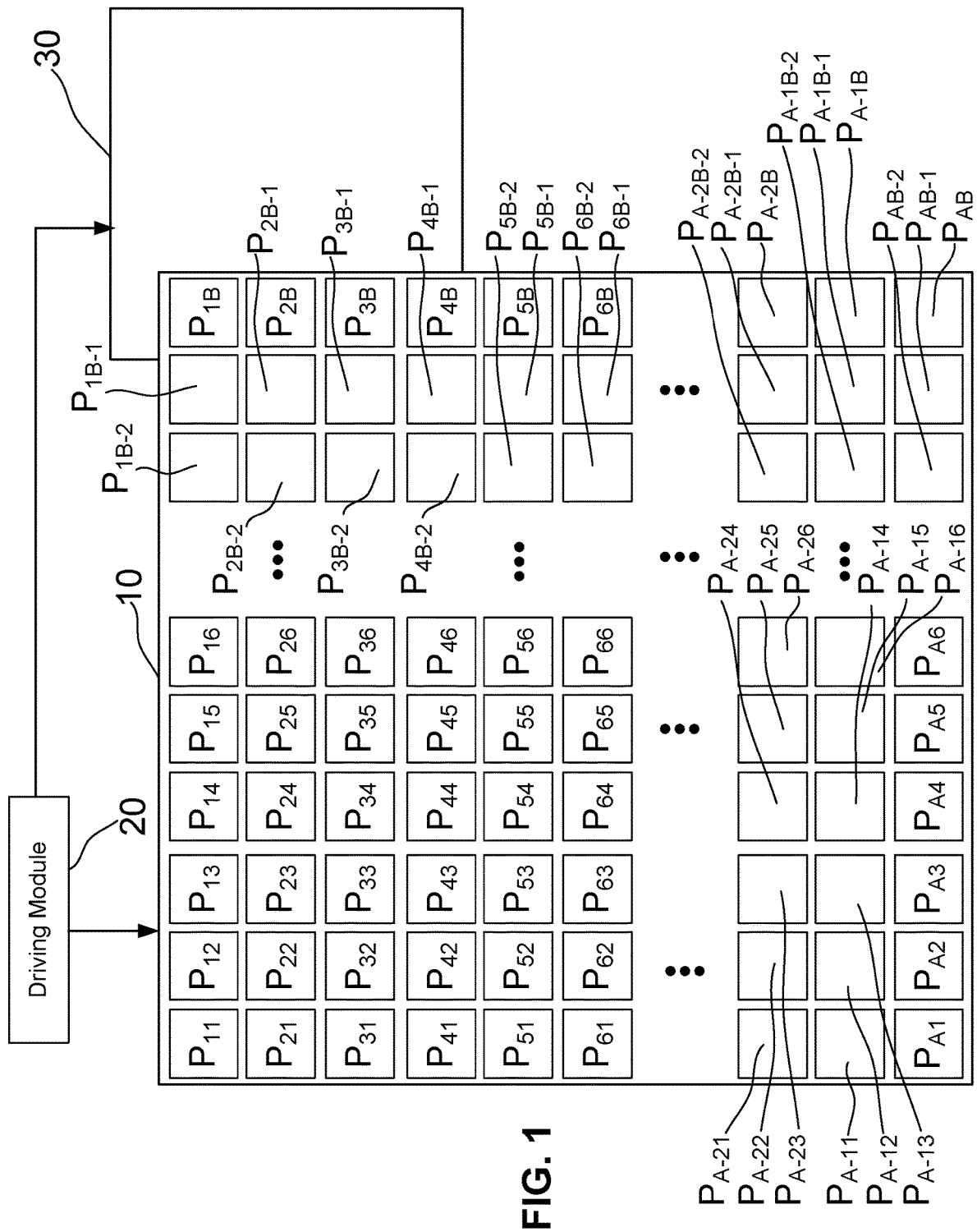
FIG. 1 is a schematic diagram of a liquid crystal display according to an embodiment of the present disclosure.

FIG. 1 is a schematic diagram of a liquid crystal display according to an embodiment of the present disclosure.

Referring to FIG. 1, the liquid crystal display according to the embodiment of the present disclosure includes: a liquid crystal panel 10, a driving module 20, and a backlight module 30.

The liquid crystal panel 10 may include a color filter substrate (i.e. CF substrate), an array substrate which are configured by cell-aligning, and negative-type VA liquid crystals interposed therebetween. In other words, the liquid crystal panel 10 is a liquid crystal panel having a VA displaying mode. Furthermore, the specific structures of the color filter substrate and the array substrate and how that the liquid crystal panel 10 is constituted by the color filter substrate, the array substrate, and a negative VA liquid crystal will not be described hereto.

In the process of assembling the liquid crystal display, the liquid crystal panel 10 and the backlight module 30 are configured to face each other, and the liquid crystal panel 10 and the backlight module 30 are fixed by a fixing means such as an outer frame. The driving module 20 drives backlight module 30 to emit light for the liquid crystal panel 10. In FIG. 1, in order to facilitate the description of the embodiment, the assembled state of the liquid crystal panel 10 and the backlight module 30 is not shown.

The liquid crystal panel 10 includes A×B liquid crystal pixels (i.e. sub pixels) $P_{11}, P_{12}, \ldots P_{AB}$. The liquid crystal pixel $P_{ab}$ (wherein $1 \leq a \leq A$, $1 \leq b \leq B$, and a, b are both an integer) may be a red liquid crystal pixel, a green liquid crystal pixel or a blue liquid crystal pixel, but the present disclosure not limited thereto. Moreover, at least a red liquid crystal pixel, at least a green liquid crystal pixel and at least a blue liquid crystal pixel must be included in these liquid crystal pixels $P_{11}, P_{12}, \ldots P_{AB}$. As an embodiment, the liquid crystal pixels arranged in a column direction are all in the same color, while a red liquid crystal pixel, a green liquid crystal pixel and a blue liquid crystal pixel are arranged sequentially in a row direction by groups.

In the liquid crystal panel 10 of this embodiment, it is not necessary to divide each liquid crystal pixel into Main/Sub secondary pixels any more. To avoid color shift phenomenon as viewing the liquid crystal panel 10 at an large viewing angle, the technical solution adopted in the embodiment is that: the liquid crystal panel 10 is configured to display the same image in two adjacent frames; the driving module 20 provide different pixel voltages of the same polarity for each of the liquid crystal pixels in two adjacent frames, so as to deflect liquid crystal molecules of each of the liquid crystal pixels; and the pixel voltage of each liquid crystal pixel in each of the two adjacent frames changes with an average pixel voltage of each of the liquid crystal pixels in a pixel interval as a parameter, from which the liquid crystal pixel is spaced respectively by a plurality of pixel distances along a first direction, a second direction, a third direction and a fourth direction.

In other words, the frame refresh frequency of the liquid crystal panel 10 is doubled. For example, the frame refresh frequency of the liquid crystal panel 10 is 120 Hz. The specific method for improving the frame refresh frequency can refer to the related content of the prior art, which will not be described hereto.

The technical solution adopted in the embodiment described above will be further set forth hereinafter.

Further referring to FIG. 1, in the previous frame of the two adjacent frames, the driving module 20 provides a high pixel voltage (or a low pixel voltage) for the liquid crystal pixel $P_{ab}$, so as to deflect the liquid crystal molecules of the liquid crystal pixel $P_{ab}$, while the driving module 20 provides low pixel voltages (or high pixel voltages) respectively for the liquid crystal pixel $P_{(a-1)b}$, the liquid crystal pixel $P_{a(b-1)}$, the liquid crystal pixel $P_{a(b+1)}$ and the liquid crystal pixel $P_{(a+1)b}$.

In the subsequent frame of the two adjacent frames, the driving module 20 provides a low pixel voltage (or a high pixel voltage) for the liquid crystal pixel $P_{ab}$, so as to deflect the liquid crystal molecules of the liquid crystal pixel $P_{ab}$, while the driving module 20 provides high pixel voltages (or low pixel voltages) respectively for the liquid crystal pixel $P_{(a-1)b}$, the liquid crystal pixel $P_{a(b-1)}$, the liquid crystal pixel $P_{a(b+1)}$ and the liquid crystal pixel $P_{(a+1)b}$.

In other words, the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction, and the values of the pixel voltages provided to each of the liquid crystal pixels in the previous frame and the subsequent frame of the two adjacent frames are different. It should be noted that the polarities of the high pixel voltages and the low pixel voltages are the same, so that the liquid crystal panel 10 can display the same image in the previous frame and the subsequent frame of the two adjacent frames.

Furthermore, the high pixel voltages and the low pixel voltages, which are in general recorded in the driving module 10 in form of Look Up Table (LUT), are determined in advance according to the inputted RGP signals and the viewing angle effect to be compensated as needed. For example, taking an 8-bit drive signal as an example, each set of the inputted RGB signals corresponds to 256 high and low pixel voltages, so that there are 3*256 high pixel voltages and 3*256 low pixel voltages in total.

In summary, by means of providing each of the liquid crystal pixels in two adjacent frames with different pixel voltages of the same polarity respectively in the two adjacent frames, and changing of the pixel voltage of each liquid crystal pixel in each of the two adjacent frames with an average pixel voltage of each of the liquid crystal pixels in a pixel interval as a parameter, from which the liquid crystal pixel is spaced respectively by a plurality of pixel distances along a first direction, a second direction, a third direction and a fourth direction, a compensation effect for a viewing angle against low color shift is thereby achieved while the liquid crystal panel 10 displays the same image in the two adjacent frames, i.e. color shift phenomenon may not occur as viewing the liquid crystal panel in a direction of an large viewing angle.

Figure 2:
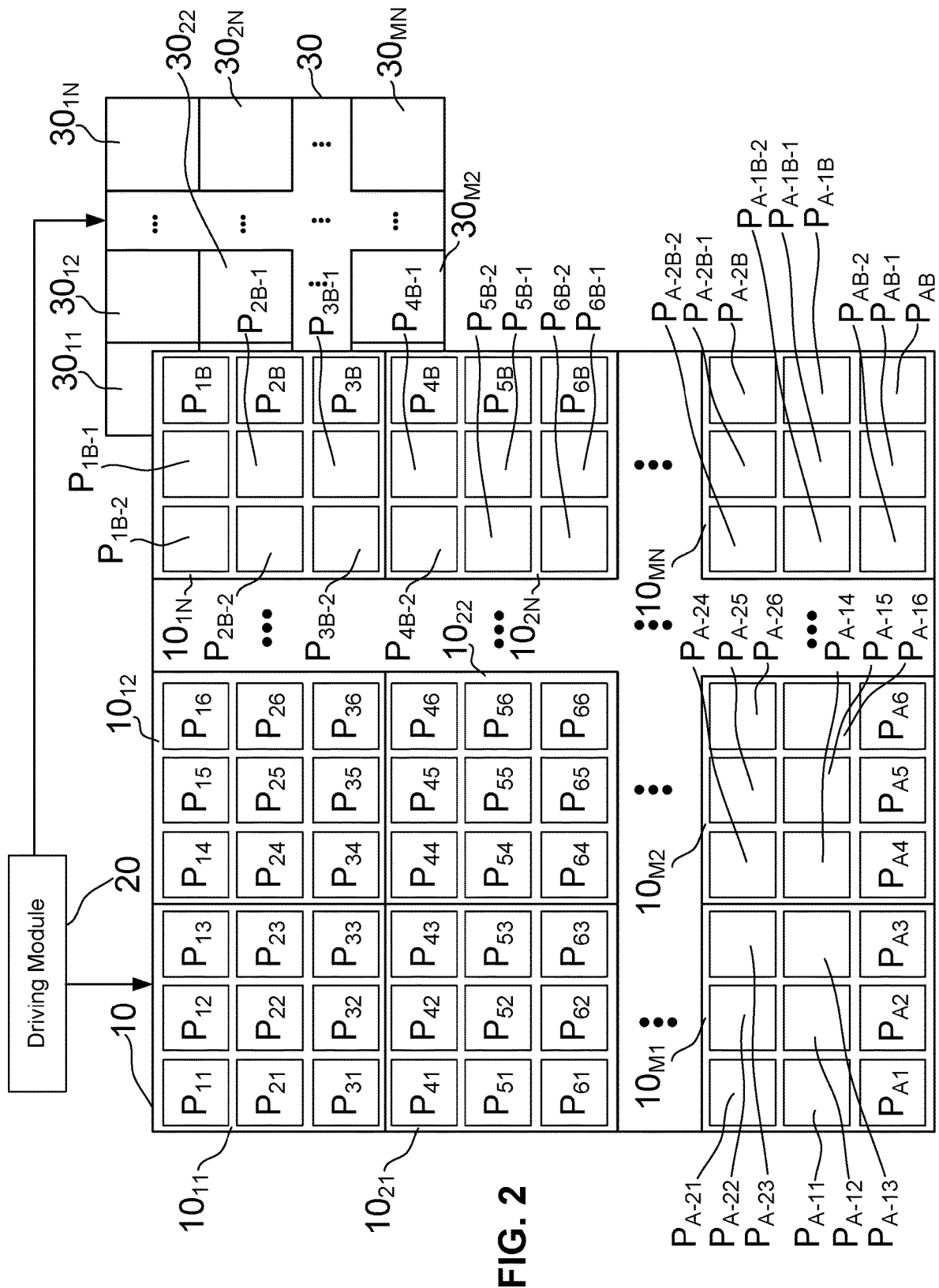
FIG. 2 is a schematic diagram of a liquid crystal display according to another embodiment of the present disclosure.

Furthermore, in order to overcome discomfort flicker phenomenon caused by the uneven luminance displayed by each of the liquid crystal pixels of the liquid crystal panel in the two adjacent frames, the backlight module 30 is divided by luminance region. By dynamically adjusting the luminance of each luminance region, the luminance of each liquid crystal pixel of the liquid crystal panel 10 is even, thereby eliminating flicker. More details refer to the liquid crystal display shown in FIG. 2. FIG. 2 is a schematic view of a liquid crystal display according to another embodiment of the present disclosure. In the following, only the differences between the embodiment shown in FIG. 2 and the embodiment shown in FIG. 1 will be described.

Referring to FIG. 2, different to the embodiment shown in FIG. 1, the liquid crystal panel 10 is divided into M×N rectangular panel partitions $10_{11}, 10_{12}, \ldots, 10_{MN}$, and the backlight module 30 is divided into M×N rectangular backlight partitions $30_{11}, 30_{12}, \ldots, 30_{MN}$, wherein the rectangular panel partition $10_{ij}$ corresponds to the rectangular backlight partition $30_{ij}$, $1 \leq i \leq M$, $1 \leq j \leq N$, and i, j both are an integer. Here, it should be noted that the number of liquid crystal pixels included in the rectangular panel partition $10_{ij}$ is the same, but may be also different from other embodiments.

In such a way, the sum of the pixel voltages of the liquid crystal pixels in the rectangular panel partition $10_{ij}$ and the luminance of the rectangular backlight partition $30_{ij}$ satisfy the following formula 1, $$L_{ij\_1} * V_{ij\_1} = L_{ij\_2} * V_{ij\_2} \quad \text{[Formula 1]}$$

wherein $L_{ij\_1}$ denotes the luminance of the rectangular backlight partition $30_{ij}$ in the previous frame of the two adjacent frames, $V_{ij\_1}$ denotes the sum of the pixel voltages of the liquid crystal pixels in the rectangular panel partition $10_{ij}$ in the previous frame of the two adjacent frames, $L_{ij\_2}$ denotes the luminance of the rectangular backlight partition $30_{ij}$ in the subsequent frame of the two adjacent frames, and $V_{ij\_2}$ denotes the sum of the pixel voltages of the liquid crystal pixels in the rectangular panel partition $10_{ij}$ in the subsequent frame of the two adjacent frames.

Here, since the pixel voltage of the liquid crystal pixel is proportional to the light transmittance of the liquid crystal pixel, the product of the light transmittance of the liquid crystal pixel and the backlight luminance is the display luminance of the liquid crystal pixel, that is, the product of the pixel voltage of the liquid crystal pixel and the backlight luminance can represent the display luminance of the liquid crystal pixel. When the products of the luminance of the rectangular backlight partition $30_{ij}$ and the sum of the pixel voltages of the liquid crystal pixels in the rectangular panel partition $10_{ij}$ in the previous frame and the subsequent frame of the two adjacent frames are equal to each other, the display luminance of the rectangular panel partition $10_{ij}$ in the previous frame and the subsequent frame of the two adjacent frames are equal to each other, so as to eliminate flicker phenomenon.

After the liquid crystal panel 10 and the backlight module 30 are both divided into partitions, the method in which the backlight module 30 provides display light to the liquid crystal panel 10 may include the following two methods, of course, the two methods described below are merely examples, and the present disclosure may further include other suitable methods.

The first method that the backlight module 30 provides display light to the liquid crystal panel 10 is that: in each of the two adjacent frames, after the liquid crystal molecules of the liquid crystal pixels in all of the rectangular panel partitions $10_{11}, 10_{12}, \ldots, 10_{MN}$ are deflected, the driving module 20 drives all of the rectangular backlight partitions $30_{11}, 30_{12}, \ldots, 30_{MN}$ to emit light. Of cause, it should be understood that the luminance of all of the rectangular backlight partitions which are regulated respectively by the driving module 20 may be different or also be the same.

The second method that the backlight module 30 provides display light to the liquid crystal panel 10 is that: in each of the two adjacent frames, after the liquid crystal molecules of the liquid crystal pixels in the rectangular panel partition $10_{ij}$ are deflected, the driving module 20 drives the rectangular backlight partition $30_{ij}$ to emit light, until all of the rectangular backlight partitions $30_{11}, 30_{12}, \ldots, 30_{MN}$ are driven to emit light. In other words, the driving module 20 drives each of the rectangular backlight partitions over time. Of cause, it should be understood that the luminance of all of the rectangular backlight partitions which are regulated respectively by the driving module 20 may be different or also be the same.

Furthermore, in order to equalize the luminance of the image displayed on the liquid crystal panel 10 with the luminance of the image displayed on the liquid crystal panel without being applied by the compensation effect for a viewing angle against low color shift, the sum of the luminance of the same image displayed in two adjacent frames in each of rectangular panel partitions of the liquid crystal panel 10 is to be twice of the luminance of the image displayed in one frame of the liquid crystal panel without being applied by any compensation effects for a viewing angle against low color shift. The specific technical solution is described as below.

The sum of the pixel voltages of the liquid crystal pixels in the rectangular panel partition $10_{ij}$ and the luminance of the rectangular backlight partition $30_{ij}$ satisfy the following formula 2, $$L_{ij\_1} * V_{ij\_1} + L_{ij\_2} * V_{ij\_2} = 2 * L_{ij} * V_{ij} \quad \text{[Formula 2]}$$

wherein $L_{ij}$ denotes the luminance of the corresponding rectangular backlight partition when the liquid crystal panel without being applied by any compensation for a viewing angle against low color shift is configured to display the image in only one frame, $V_{ij}$ denotes the sum of the pixel voltages of the liquid crystal pixels in the corresponding rectangular panel partition when the liquid crystal panel without being applied by any compensation for a viewing angle against low color shift is configured to display the image in only one frame. It should be noted that the images displayed in different frames of the liquid crystal panel without being applied by any compensation for a viewing angle against low color shift are different.

Figure 3:
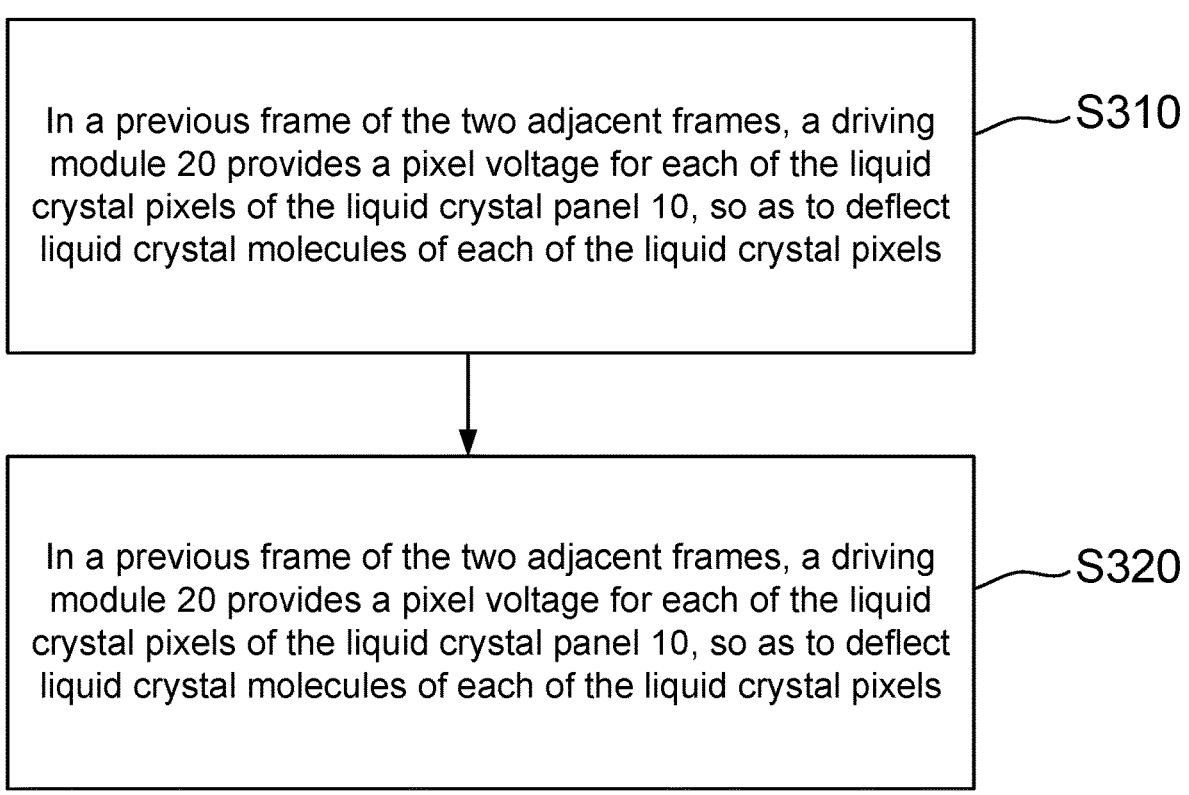
FIG. 3 is a flow chart of a driving method for the liquid crystal display shown in FIG. 1.

The driving method for the liquid crystal display will be described below. FIG. 3 is a flow chart of the driving method for the liquid crystal display shown in FIG. 1.

Referring to FIG. 1 and FIG. 3, the driving method for a liquid crystal display according to the embodiment of the present disclosure includes:

In step S310, in a previous frame of the two adjacent frames, a driving module 20 provides a pixel voltage for each of the liquid crystal pixels of the liquid crystal panel 10, so as to deflect liquid crystal molecules of each of the liquid crystal pixels.

In step S320, in a subsequent frame of the two adjacent frames, the driving module 20 provides a pixel voltage for each of the liquid crystal pixels of the liquid crystal panel 10, so as to deflect liquid crystal molecules of each of the liquid crystal pixels.

Wherein in the previous frame and the subsequent frame, the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction, and the pixel voltages of the same liquid crystal pixel have the same polarity but are different in values.

FIG. 4 is a flow chart of the driving method for the liquid crystal display shown in FIG. 2.

Referring to FIG. 2 and FIG. 4, the driving method for the liquid crystal display according to the embodiment of the present disclosure includes:

In step S410, in a previous frame of the two adjacent frames, a driving module 20 provides a pixel voltage for each of the liquid crystal pixels of the liquid crystal panel 10, so as to deflect liquid crystal molecules of each of the liquid crystal pixels.

In step S420, in the previous frame of the two adjacent frames, after the liquid crystal molecules of the liquid crystal pixels in the rectangular panel partitions $10_{11}, 10_{12}, \ldots, 10_{MN}$ of the liquid crystal panel 10 are deflected, the driving module 20 drives all of the rectangular backlight partitions $30_{11}, 30_{12}, \ldots, 30_{MN}$ to emit light at the same time.

In step S430, in a subsequent frame of the two adjacent frames, the driving module 20 provides a pixel voltage for each of the liquid crystal pixels of the liquid crystal panel 10, so as to deflect liquid crystal molecules of each of the liquid crystal pixels.

In step S440, in the subsequent frame of the two adjacent frames, after the liquid crystal molecules of the liquid crystal pixels in the rectangular panel partitions $10_{11}$, $10_{12}$, . . . , $10_{MN}$ of the liquid crystal panel 10 are deflected, the driving module 20 drives all of the rectangular backlight partitions $30_{11}$, $30_{12}$, . . . , $30_{MN}$ to emit light at the same time.

Wherein in the previous frame and the subsequent frame, the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction, and the pixel voltages of the same liquid crystal pixel have the same polarity but are different in values.

FIG. 5 is a flow chart of another driving method for the liquid crystal display shown in FIG. 2.

Referring to FIG. 2 and FIG. 4, the driving method for the liquid crystal display according to the embodiment of the present disclosure includes:

In step S510, in a previous frame of the two adjacent frames, a driving module 20 provides a pixel voltage for each of the liquid crystal pixels of the liquid crystal panel 10, so as to deflect liquid crystal molecules of each of the liquid crystal pixels.

In step S520, in the previous frame of the two adjacent frames, after the liquid crystal molecules of the liquid crystal pixels in the rectangular panel partitions $10_{ij}$ of the liquid crystal panel 10 are deflected, the driving module 20 drives the rectangular backlight partition $30_{ij}$ to emit light, until all of the rectangular backlight partitions $30_{11}$, $30_{12}$, . . . , $30_{MN}$ are driven to emit light.

In step S530, in a subsequent frame of the two adjacent frames, the driving module 20 provides a pixel voltage for each of the liquid crystal pixels of the liquid crystal panel 10, so as to deflect liquid crystal molecules of each of the liquid crystal pixels.

In step S540, in the subsequent frame of the two adjacent frames, after the liquid crystal molecules of the liquid crystal pixels in the rectangular panel partitions $10_{ij}$ of the liquid crystal panel 10 are deflected, the driving module 20 drives the rectangular backlight partition $30_{ij}$ to emit light, until all of the rectangular backlight partitions $30_{11}$, $30_{12}$, . . . , $30_{MN}$ are driven to emit light.

Wherein in the previous frame and the subsequent frame, the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction, and the pixel voltages of the same liquid crystal pixel have the same polarity but are different in values.

Moreover, in the driving method shown in FIG. 4 and FIG. 5, the sum of the pixel voltages of the liquid crystal pixels in the rectangular panel partition $10_{ij}$ and the luminance of the rectangular backlight partition $30_{ij}$ further satisfy the formula 1 and/or formula 2 above.

By means of providing each of the liquid crystal pixels in two adjacent frames with different pixel voltages of the same polarity respectively in the two adjacent frames, and changing of the pixel voltage of each liquid crystal pixel in each of the two adjacent frames with an average pixel voltage of each of the liquid crystal pixels in a pixel interval as a parameter, from which the liquid crystal pixel is spaced respectively by a plurality of pixel distances along a first direction, a second direction, a third direction and a fourth direction, a compensation effect for a viewing angle against low color shift is thereby achieved while the liquid crystal panel displays one same image in the two adjacent frames, i.e. color shift phenomenon may not occur as viewing the liquid crystal panel in a direction of an large viewing angle. Moreover, it is not necessary to add any metal wires and thin-film transistors to drive Main/Sub secondary pixels, since a liquid crystal pixel is not divided into Main/Sub secondary pixels any more, thus not reducing the aperture ratio. Further, the products of the luminance of each of the rectangular backlight partitions and the sum of the pixel voltages of the liquid crystal pixels in the corresponding rectangular panel partition in the previous and subsequent frame of the two adjacent frames are equalized, so as to equalize the displaying luminance of each of the rectangular panel partitions in the two adjacent frames, and thus flicker phenomenon can be eliminated. Furthermore, the sum of the luminance of the same image displayed in two adjacent frames in each of rectangular panel partitions of the liquid crystal panel is to be twice of the luminance of the image displayed in one frame of the liquid crystal panel without being applied by any compensation effects for a viewing angle against low color shift, so as to equalize the luminance of the image displayed in the liquid crystal panel with the luminance of the image displayed in the liquid crystal panel without being applied by any compensation effects for a viewing angle against low color shift.

Moreover, it should be emphasized that the pixel voltage of each liquid crystal pixel changes with an average pixel voltage of each of the liquid crystal pixels in a pixel interval as a parameter, from which the liquid crystal pixel is spaced respectively by a plurality of pixel distances along a first direction, a second direction, a third direction and a fourth direction, thereby further to provide a method for eliminating color shift phenomenon of an image of a liquid crystal display have VA liquid crystals.

Although the present disclosure has been shown and described with reference to specific embodiments, those skilled in the art will appreciate that various changes in form and detail may be made herein without departing from the spirit and scope of the invention as defined by the claims and their equivalents.

The invention claimed is:

1. A liquid crystal display, comprising:
   a liquid crystal panel comprising a plurality of liquid crystal pixels and configured to display the same image in two adjacent frames; and
   a driving module configured to respectively provide different pixel voltages of the same polarity for each of the liquid crystal pixels in the two adjacent frames, so as to deflect liquid crystal molecules of each of the liquid crystal pixels;
   wherein in each frame of the two adjacent frames, the pixel voltage of each liquid crystal pixel is different from pixel voltages of existing liquid crystal pixels adjacent to the liquid crystal pixel along any of a first direction, a second direction, a third direction and a fourth direction.

2. The liquid crystal display of claim 1, wherein the liquid crystal display further comprises a backlight module, the liquid crystal panel is divided into M×N rectangular panel partitions, the backlight module is divided into M×N rectangular backlight partitions, 1≤i≤M, 1≤j≤N, and the rectangular panel partition of the i-th row and the j-th column corresponds to the rectangular backlight partition of the i-th row and the j-th column;

in each frame of the two adjacent frames, after the liquid crystal molecules of each liquid crystal pixel in each of the rectangular panel partitions are deflected, the driving module is configured to drive all of the rectangular backlight partitions to emit light at the same time.

3. The liquid crystal display of claim 2, wherein a sum of the pixel voltages of the liquid crystal pixels in the rectangular panel partition of the i-th row and j-th column, and luminance of the rectangular backlight partition of the i-th row and j-th column satisfy the following formula 1, $$L_{ij\_1}*V_{ij\_1}=L_{ij\_2}*V_{ij\_2} \quad \text{[Formula 1]}$$

wherein $L_{ij\_1}$ denotes the luminance of the rectangular backlight partition of the i-th row and the j-th column in a previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in a subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

4. The liquid crystal display of claim 3, wherein the sum of the pixel voltages of the liquid crystal pixels in the rectangular panel partition of the i-th row and j-th column and the luminance of the rectangular backlight partition of the i-th row and j-th column satisfy the following formula 2

$$L_{ij\_1}*V_{ij\_1}+L_{ij\_2}*V_{ij\_2}=2*L_{ij}*V_{ij} \quad \text{[Formula 2]}$$

wherein $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

5. The liquid crystal display of claim 1, wherein the liquid crystal panel is divided into M×N rectangular panel partitions, the backlight module is divided into M×N rectangular backlight partitions, 1≤i≤M, 1≤j≤N, and the rectangular panel partition of the i-th row and the j-th column corresponds to the rectangular backlight partition of the i-th row and the j-th column;

in each frame of the two adjacent frames, after the liquid crystal molecules of each liquid crystal pixel in the rectangular panel partition of the i-th row and j-th column are deflected, the driving module is further configured to drive the rectangular backlight partition of the i-th row and j-th column to emit light, until all of the rectangular backlight partitions are driven to emit light.

6. The liquid crystal display of claim 5, wherein a sum of the pixel voltages of the liquid crystal pixels in the rectangular panel partition of the i-th row and j-th column and luminance of the rectangular backlight partition of the i-th row and j-th column satisfy the following formula 1, $$L_{ij\_1}*V_{ij\_1}=L_{ij\_2}*V_{ij\_2} \quad \text{[Formula 1]}$$

wherein $L_{ij\_1}$ denotes the luminance of the rectangular backlight partition of the i-th row and the j-th column in a previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in a subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

7. The liquid crystal display of claim 6, wherein the sum of the pixel voltages of the liquid crystal pixels in the rectangular panel partition of the i-th row and j-th column and the luminance of the rectangular backlight partition of the i-th row and j-th column satisfy the following formula 2, $$L_{ij\_1}*V_{ij\_1}+L_{ij\_2}*V_{ij\_2}=2*L_{ij}*V_{ij} \quad \text{[Formula 2]}$$

wherein $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

8. The liquid crystal display of claim 5, wherein a sum of the pixel voltages of the liquid crystal pixels in the rectangular panel partition of the i-th row and j-th column and luminance of the rectangular backlight partition of the i-th row and j-th column satisfy the following formula 2, $$L_{ij\_1}*V_{ij\_1}+L_{ij\_2}*V_{ij\_2}=2*L_{ij}*V_{ij} \quad \text{[Formula 2]}$$

wherein $L_{ij}$ denotes the luminance of the rectangular backlight partition of the i-th row and j-th column when the liquid crystal display is configured to display the image only in one frame, $V_{ij}$ denotes the sum of the pixel voltages of the liquid crystal pixels in the rectangular panel partition when the liquid crystal display is configured to display the image only in one frame, $L_{ij\_1}$ denotes the luminance of the rectangular backlight partition of the i-th row and the j-th column in a previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in a subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames.

9. A driving method for a liquid crystal display, comprising:

providing, by a driving module, a pixel voltage to each of liquid crystal pixels of a liquid crystal panel in a previous frame of two adjacent frames, so as to deflect liquid crystal molecules of each of the liquid crystal pixels, wherein the liquid crystal panel is configured to display the same image in the two adjacent frames; and providing, by the driving module, a pixel voltage to each of the liquid crystal pixels of the liquid crystal panel in a subsequent frame of the two adjacent frames, so as to deflect liquid crystal molecules of each of the liquid crystal pixels, wherein the pixel voltage of each liquid crystal pixel is different from pixel voltages of existing liquid crystal pixels adjacent to the liquid crystal pixel along any of a first direction, a second direction, a third direction and a fourth direction, and the pixel voltages of the same liquid crystal pixel in the previous frame and in the subsequent frame have the same polarity but are different in values.

10. The driving method for the liquid crystal display of claim 9, wherein the liquid crystal display further comprises a backlight module, wherein the liquid crystal panel is divided into M×N rectangular panel partitions, the backlight module is divided into M×N rectangular backlight partitions, 1≤i≤M, 1≤j≤N, and the rectangular panel partition of the i-th row and the j-th column corresponds to the rectangular backlight partition of the i-th row and the j-th column, wherein the driving method for the liquid crystal display further comprises:

in the previous frame of the two adjacent frames, after the liquid crystal molecules of each liquid crystal pixel in each of the rectangular panel partitions are deflected, driving, by the driving module, all of the rectangular backlight partitions to emit light at the same time, and in the subsequent frame of the two adjacent frames, after the liquid crystal molecules of each liquid crystal pixel in each of the rectangular panel partitions are deflected, driving, by the driving module drives, all of the rectangular backlight partitions to emit light at the same time.

11. The driving method for the liquid crystal display of claim 10, wherein a sum of the pixel voltages of the liquid crystal pixels in the rectangular panel partition of the i-th row and j-th column and luminance of the rectangular backlight partition of the i-th row and j-th column satisfy the formula 1 and/or the formula 2 as following, $$L_{ij\_1} * V_{ij\_1} = L_{ij\_2} * V_{ij\_2} \qquad \text{[Formula 1]}$$

$$L_{ij\_1} * V_{ij\_1} + L_{ij\_2} * V_{ij\_2} = 2 * L_{ij} * V_{ij} \qquad \text{[Formula 2]}$$

wherein, $L_{ij\_1}$ denotes the luminance of the rectangular backlight partition of the i-th row and the j-th column in the previous frame of two adjacent frames, $V_{ij\_1}$ denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames, $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

12. The driving method for the liquid crystal display of claim 9, wherein the liquid crystal panel is divided into M×N rectangular panel partitions, the backlight module is divided into M×N rectangular backlight partitions, 1≤i≤M, 1≤j≤N, and the rectangular panel partition of the i-th row and the j-th column corresponds to the rectangular backlight partition of the i-th row and the j-th column, wherein the driving method for the liquid crystal display further comprises:

in the previous frame of the two adjacent frames, after the liquid crystal molecules of each liquid crystal pixel in the rectangular panel partition of the i-th row and j-th column are deflected, driving, by the driving module, the rectangular backlight partition of the i-th row and j-th column to emit light, until all of the rectangular backlight partitions are driven to emit light, and in the subsequent frame of the two adjacent frames, after the liquid crystal molecules of each liquid crystal pixel in the rectangular panel partition of the i-th row and j-th column are deflected, driving, by the driving module, the rectangular backlight partition of the i-th row and j-th column to emit light, until all of the rectangular backlight partitions are driven to emit light.

13. The driving method for the liquid crystal display of claim 12, wherein a sum of the pixel voltages of the liquid crystal pixels in the rectangular panel partition of the i-th row and j-th column and luminance of the rectangular backlight partition of the i-th row and j-th column satisfy the formula 1 and/or the formula 2 as following, $$L_{ij\_1} * V_{ij\_1} = L_{ij\_2} * V_{ij\_2} \qquad \text{[Formula 1]}$$

$$L_{ij\_1} * V_{ij\_1} + L_{ij\_2} * V_{ij\_2} = 2 * L_{ij} * V_{ij} \qquad \text{[Formula 2]}$$

wherein, $L_{ij\_1}$ denotes the luminance of the rectangular backlight partition of the i-th row and the j-th column in the previous frame of two adjacent frames, Vij_1 denotes the sum of the pixel voltages of the liquid crystal pixels in the rectangular panel partition of the i-th row and the j-th column in the previous frame of the two adjacent frames, $L_{ij\_2}$ denotes the luminance of the rectangular backlight partition of the i-th row and the j-th column in the subsequent frame of two adjacent frames, $V_{ij\_2}$ denotes the sum of the pixel voltages of the liquid crystal pixels in the rectangular panel partition of the i-th row and the j-th column in the subsequent frame of the two adjacent frames, $L_{ij}$ denotes the luminance of the rectangular backlight partition of the i-th row and j-th column when the liquid crystal display is configured to display the image only in one frame, and $V_{ij}$ denotes the sum of the pixel voltages of the liquid crystal pixels in the rectangular panel partition when the liquid crystal display is configured to display the image only in one frame.

\* \* \* \* \*